March 29, 1966 H. G. O'BRIEN 3,243,562

UNITARY ELECTRICAL CONNECTOR DEVICE

Filed June 1, 1964

INVENTOR.
HAROLD G. O'BRIEN
BY Thomas J. Nikolai
ATTORNEY

United States Patent Office 3,243,562

Patented Mar. 29, 1966

3,243,562

UNITARY ELECTRICAL CONNECTOR DEVICE

Harold G. O'Brien, Minneapolis, Minn., assignor to Sperry Rand Corporation, New York, N.Y., a corporation of Delaware Filed June 1, 1964, Ser. No. 371,382

7 Claims. (Cl. 200—166)

The present invention relates generally to a connector element for electrically interconnecting conductor elements of printed circuitry.

More importantly still the invention is characterized by a flexible elongated wire bent in substantially a U-shaped pattern to maintain electrical and mechanical interconnection of conductor elements by utilizing a unique contact arrangement wherein a long portion of the wire extends parallel to and in contact with a conductor on one surface of the printed circuit, another portion of the elongated wire is bent to extend through an aperture in the printed circuit element and hereafter a cantilevered tongue portion gradually extends while the remaining portion of the wire extends through a second aperture in the printed circuit and terminates with a salient bight cooperating to secure the tongue portion in a disengageable manner to provide a selective connector between conductive strips.

In the present stage of connector technology, various types of structural configurations have been utilized to provide suitable mechanical and electrical interconnections. Patent 2,902,629, with particular reference to FIG. 4, discloses a connector between conductor elements wherein the coil extends through one aperture in panel 4 and forms a shoulder to position the connector in such a way as to provide capillary action for the soldering technique. A disadvantage of the connector resides in the fact that it is fixedly secured by soldering, thus the inter-conductor connection cannot be selectively opened and closed.

Patent 2,993,188 discloses a contact plug device wherein substantially U-shaped metal strips for a plug type connector are positioned around the edge of the circuit card. However, the plug connector element is not directed to the feature of connecting conductors disposed on alternate surfaces of a printed circuit board, but rather the tongue of the U-shaped element passes through an aperture in the card and through a foramen in the element and is bent in a permanent clamping position as distinguished from the instant invention.

Patent 3,121,279 teaches a method of fastening connecting wires to electrical component parts wherein the capillar ends are dip-soldered to form a permanent connection. The invention is not directed to connector elements joining conductors disposed on opposite sides of printed circuit boards.

The object of this invention is to provide apparatus for facilitating interconnection between conductive elements of printed circuit cards.

An additional object of the invention is to provide a flexible interconnector adapted to be clasped and unclasped.

It is a further object of the invention to provide an inexpensive switch element for a printed circuit board.

These and other more detailed and specific objects will be disclosed in the course of the following specification, reference being had to the accompanying drawings, in which.

Figure 1:
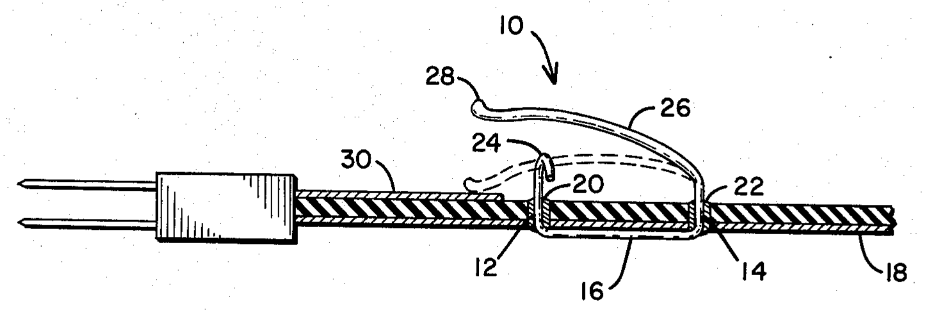
FIGURE 1 is a side view of the connector element with the closed position in dotted lines showing the interconnection between conductive elements and showing the open position in full lines.

Referring now to FIGURE 1, the connector element consists of a substantially U-shaped elongated flexible wire such as piano wire 10 (or precious metal plated Phosphor bronze), for example, comprising two portions 12 and 14 bent at right angles to portion 16 extending parallel to and in mechanical and electrical contact with the printed circuit conductive element 18. The board 18 contains two apertures 20 and 22 through which extend the portions 12 and 14. Portion 12 terminates with a salient bight 24. The opposite and longest portion of the flexible wire 10 consists of a gradually inclined tongue portion 26 terminating with a flattened or rounded tip 28.

In its closed position the portion 26 fits under the bight 24 much in the fashion of a safety pin. The flattened or rounded tip 28 contacts the other conductor element 30 thereby providing a continuous circuit from one conductor to another.

Figure 2:
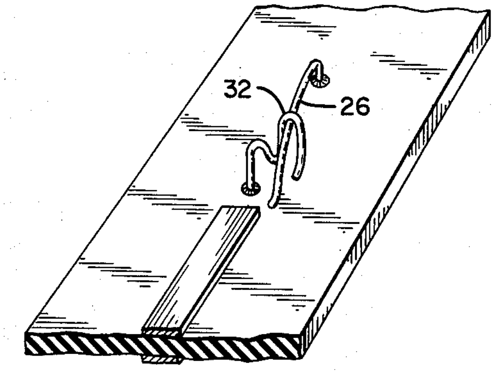
FIGURE 2 is a top view in perspective illustrating a modification of the connector in which a second bight limits motion of the connector in the open position.

With reference to the modification illustrated in FIGURE 2, the elongated flexible wire portion corresponding to portion 12 illustrated in FIGURE 1, is extended to include a second bight 32. When in the open position, the tongue portion 26 is limited in its movement by engagement under the bight 32. This feature reduces the likelihood of interaction between the tongue portion and an adjacent superimposed printed circuit board conductive element when the tongue is in the open position.

In the application of the connectors illustrated in FIGURES 1 and 2 to a printed circuit board, the U-shaped wire is projected through the two apertures in a manner such that the flat portion extending parallel to the conductor makes contact with it. The printed circuit board may be operatively connected to a printed circuit edge connector having wire wrap terminals.

The connectors illustrated are secured in position by a soldering technique within the apertures. Inasmuch as the wire is flexible, inter-plane electrical connections can be opened and closed as desired by merely depressing the flexible end in such a manner so as to engage or disengage the bight.

It is also evident that the circuits can be arranged on the printed circuit board such that the connector can be adapted to connect circuits on the same side of the printed circuit board.

The connector also lends itself to use in a matrix type plug board as well as a general purpose programming switch.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. Apparatus for connecting conductive elements of a printed circuit board comprising in combination a printed circuit board, two apertures extending through said board, an elongated flexible wire connector having a first portion extending parallel to and in contact with one of said elements, a second portion substantially perpendicular to one end of said parallel portion and extending through and beyond one of the apertures, said second portion terminating in a hook, a third portion of said wire extending substantially perpendicular to another end of said parallel portion through the other aperture for a distance less than said second portion, a fourth cantilevered tongue portion longer than said first portion of said wire and extending on the opposite side of said board terminating in a flattened surface, whereby electrical and mechanical interconnection of said printed circuit conductive elements is accomplished by engaging said fourth portion under said hook thereby engaging said flattened surface with the other of said conductive elements.

2. The invention defined in claim 1 wherein said fourth portion may be clasped and unclasped selectively to close or open electrical interconnection, respectively.

3. The invention defined in claim 1 wherein the second portion comprises an extended portion terminating with a second hook whereby the tongue portion is limited to engagement under the second hook when in an open condition.

4. An electrical connector for interconnecting electrical conductor means mounted on a circuit board, the invention comprising:

(A) a continuous one-piece electrically conductive connector selectively physically closing upon itself in a loop-like configuration when in an electrical connect position with respect to the circuit board conductor means, said connector including as portions thereof:

(1) a U-shaped portion which contacts conductor means and further including a terminating portion at one end thereof with a bight and at another end with a cantilevered tongue portion, said tongue portion being engaged under said bight to effect said physically closing relationship and further extending beyond the bight to contact other conductor means on the board.

5. The invention of claim 4 wherein said connector is in an electrical disconnect condition when the cantilevered tongue portion is in a disengaged position from the bight and while in said position the connector is in a physically unclosed relationship with itself.

6. Apparatus for connecting conductive means disposed on opposite sides of a circuit board electrically associated with an edge connector comprising: a modified, one-piece U-shaped connector element extending through apertures in the circuit board and having one portion in contact with conductive means, a tongue portion end of said connector element being selectively engageable under a first hooked portion extending from another end of the connector element whereby in the hooked position the tongue portion contacts other conductive means to effect electrical interconnection between all said conductive means, and whereby all said conductive means are disconnected while said tongue portion is in an unhooked position.

7. The invention defined in claim 6 wherein said tongue portion is engageable with a second hooked portion extending from said first hooked portion when in an electrical disconnect condition.

References Cited by the Examiner

UNITED STATES PATENTS 3,170,056 2/1965 Keene ______________ 200—166

KATHLEEN H. CLAFFY, *Primary Examiner.*

H. O. JONES, *Assistant Examiner.*